Oct. 21, 1947.    H. C. WILSON    2,429,382
COMBINED DRILL AND CUTTER
Filed June 26, 1944
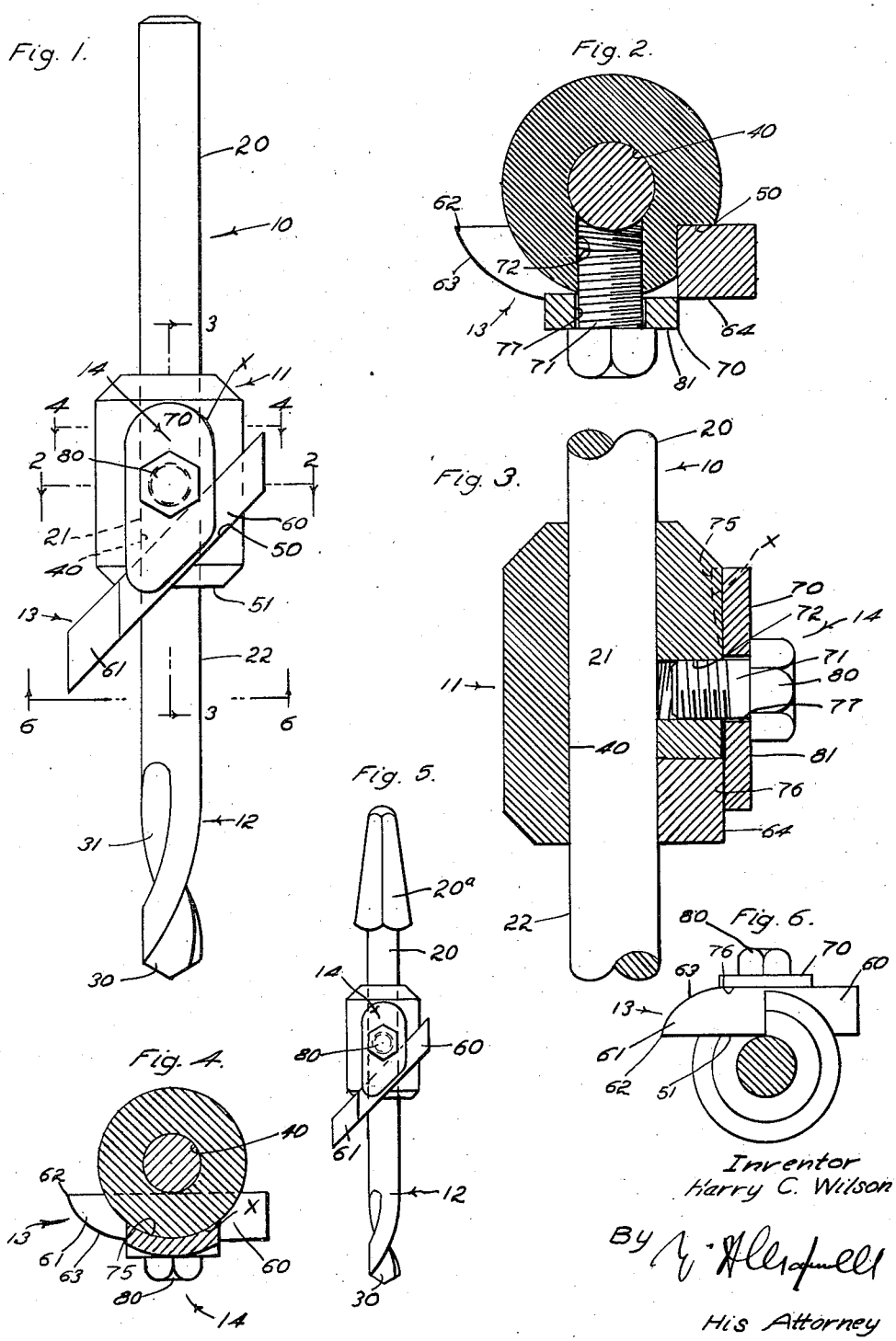
Inventor
Harry C. Wilson
By [signature]
His Attorney Patented Oct. 21, 1947

2,429,382

UNITED STATES PATENT OFFICE 2,429,382

COMBINED DRILL AND CUTTER

Harry C. Wilson, Beverly Hills, Calif., assignor to Robert H. Clark, Los Angeles, Calif.

Application June 26, 1944, Serial No. 542,183

4 Claims. (Cl. 77—65)

This invention has to do with a combined drill and cutter and it is a general object of the invention to provide a simple, practical and effective tool operable to drill a hole and then perform a boring operation concentric with the drilled hole, all in the course of one continuous operation.

In boring holes in various objects or materials, for example in boring holes of appreciable size in sheet materials or thin walled bodies it is customary to first drill a small hole to serve as a pilot hole. A boring tool is then employed having a pilot pin to enter the pilot hole and a cutter which is guided to make the desired final bore. This practice not only involves two distinct operations, namely the formation of the pilot hole and then the boring of the final hole, but requires separate and distinct units of equipment or apparatus the handling of which is time consuming.

It is a general object of my invention to provide in one single simple tool a drill and a hole boring device, so that with one set-up or in one continuous operation a small or pilot hole is bored and then as the operation is continued the final bore is made while the pilot bore serves as a guide.

It is another object of my invention to provide a tool of the general character referred to in which there is a minimum number of parts, which parts are extremely simple and inexpensive of manufacture. In the preferred form of the invention I provide a tool which merely involves a straight plain stem with a twist drill formed at one end, and with a simple body applied intermediate its ends, which body has a cutter clamped to it through a simple clamp device.

The various objects and features of my invention will be fully understood from the following detailed description of typical preferred forms and applications of my invention, throughout which description reference is made to the accompanying drawings, in which:

Fig. 1 is a side elevation of a tool embodying my invention. Fig. 2 is an enlarged detailed sectional view of the construction taken as indicated by line 2—2 on Fig. 1. Fig. 3 is a longitudinal detailed sectional view of the construction being a view taken as indicated by line 3—3 on Fig. 1. Fig. 4 is a transverse sectional view taken as indicated by line 4—4 on Fig. 1. Fig. 5 is a view of a reduced size similar to Fig. 1, showing another form of construction, and Fig. 6 is a view taken on line 6—6 on Fig. 1.

The device of the present invention involves, generally a stem 10, a body 11 carried on the stem, a drill 12 projecting from the lower end of the stem, a cutter 13 carried by the body and means 14 clamping the cutter in place on the body.

The stem 10 in the form of the invention shown in Figs. 1 to 3, inclusive, is a straight bar round in cross section having an upper end portion 20 forming a shank for mounting the device in a suitable operating tool or machine, a middle portion 21 to receive and carry the body 11, and a lower end portion 22 projecting a suitable distance below the body 11. The stem may be a straight turned member and, in practice, its exterior may be ground so that the several parts are smooth and accurate as to size.

The drill 12 projects from or beyond the lower end of the stem portion 22. In fact, it is preferably an integral continuation of the stem. The drill is preferably in the form of a simple twist drill having a cutting end 30 and spiral flutes 31 for the relief of cuttings. I prefer to form or proportion the drill 12 so that it will bore a hole the size of the lower end portion 22 of the stem or, in other words, I make the drill 12 of the same diameter as the stem.

The body 11 surrounds and is fixed on the middle portion 21 of the stem. The body is preferably in the form of a simple collar or sleeve, the exterior of which is round. The body has a bore 40 which accurately receives the stem. In accordance with my invention the body is fixed or made secure on the portion 21 of the stem. This may be accomplished by welding these parts together, by shrinking the body onto the stem, or by any suitable means applicable to such constructions. I have found that an effective joinder of these parts can be accomplished by making the stem and body fit rather close and then inserting a small amount of solder in the threaded opening provided in the body for the clamp screw, as hereinafter described, and then applying heat so that the solder bonds the parts together.

In carrying out the invention I may employ one or more cutters 13. However, I prefer to use but one cutter and I provide a single, angularly disposed channel 50 in one side of the body 11 to receive the cutter. The channel 50 is formed at an angle to the axis of the body or the axis of the tool so that the cutter is carried by the channel to extend downwardly and outwardly from the lower end 51 of the body. In the preferred arrangement the channel is located so its lower end opens at the end 51 of the body adjacent the drill so the sharpened leading edge 51ᵃ of the cutter will cut right up to the drill if necessary.

The cutter 13 has a shank 60 received in the channel 50 of the body and has a cutting end 61 dressed to make the desired cut in the material to be worked upon. In the particular case illustrated the cutter is dressed to have a forwardly facing cutting edge 62 extending parallel with the axis of the tool and the surface 63 at the rear of the edge 62 is cut away to give clearance or relief as the cutter operates.

In practice the shank 60 of the cutter may vary in size and shape. However, in most cases I prefer to employ a shank that is substantially rectangular in cross section and I proportion the channel 50 so that it carries the shank with its outer face 64 projecting slightly above or beyond the outer surface of the body 11.

The clamping means 14 preferably includes a clamp plate 70 and a clamp screw 71. The plate 70 is carried on the screw 71 which is threaded into an opening 72 in the body 11 so that it has one end portion bearing on the exterior of the body 11 at X while its other end portion bears on the outer projecting surface 64 of the cutter shank 60. In accordance with my invention inner surface 75 of the plate 70 at the point X is made concave to fit the exterior of the body 11 while the surface 76 of the plate where it engages the cutter is flat to fit against the surface 64 of the cutter. The clamp screw 71 fits loosely through the opening 77 in the plate 70 and screw threads into the opening 72 provided in the body adjacent the channel 50. The opening 72 is preferably formed to extend into and join the central opening 40 of the body and as above described may serve as an opening through which a suitable amount of solder, or the like, can be introduced to join the body and stem. A head 80 on the outer end of the screw engages the outer side 81 of the clamp plate so that when the screw is tightened in the opening 72 the plate is clamped tightly against the cutter to fit it firmly in the channel 50.

In using the device that I have provided the upper end portion or shank end 20 of the stem 10 is gripped in a suitable machine such as in the chuck of a drill press and the cutter 13 is set through the means 11 so that it projects the desired distance from the central axis of the tool. When the tool is operated the drill 12 serves to cut a pilot hole through the material being worked upon, and as the tool advances the lower end portion 22 of the stem enters the drilled hole and serves as a pilot or guide while the cutter 13 is advanced into engagement with the material. The cutter is operated to make the desired bore in the material and is effectively guided by the portion 22 in the course of its operation. It will be understood, of course, that the cutter 13 can be readily adjusted to vary the size of the bore and how the cutting part 61 and edge 51a of the cutter can be dressed or shaped to act most effectively on the material being acted upon.

In the form of the invention shown in Fig. 5 the shank portion 20 of the stem instead of being a plain or straight element, as shown in Fig. 1, is provided with an enlarged polygonal head 20a. The particular head 20a shown in the drawings is suitable for and is adapted to be handled by the chuck element of a brace such as is ordinarily employed for handling wood augers or bits.

Having described only typical, preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A tool of the character described including a single integral round bar shaped member having an upper end portion forming a shank and a lower portion forming a pilot, a plain tubular body fixedly engaged around said member in direct engagement therewith between said portions to be permanently set thereon, the body having an inclined outwardly facing channel in its outer side, a cutter arranged in the channel in the body to project below the body at an angle to said pilot, and means clamping the cutter to seat in the channel.

2. A tool of the character described including a single integral member having an upper end portion forming a shank and a lower portion forming a pilot and a drill on the lower end of said lower portion, a body bearing completely around the said member to be fixedly engaged thereon between said portions and having an inclined outwardly facing channel in its outer side, a cutter arranged in the channel in the body to seat on the bottom thereof, and means clamping the cutter to seat it in the channel, the said drill and lower portion being of the same diameter, the said member being round in cross section and substantially uniform in diameter throughout its length.

3. A tool of the character described including a body having an outwardly facing channel in one side inclined relative to the longitudinal axis of the tool, a cutter in the channel, a shank projecting from the upper end of the body, a pilot projecting from the lower end of the body, a screw threaded into the side of the body adjacent the channel, and a clamp plate carried by the screw so the screw engages the middle portion of the plate while one end of the plate is bearing on the cutter and the other is bearing on the exterior of the body, the said other end of the plate having projecting parts cooperating with the body so the plate is held against turning on the screw in a position to engage the cutter.

4. A tool of the character described including a body round in cross section and having an outwardly facing channel in one side inclined relative to the longitudinal axis of the tool, a cutter seated in the channel, a shank projecting from the upper end of the body, a pilot projecting from the lower end of the body, a screw threaded into the outer side of the body adjacent the channel, and an elongate clamp plate carried by the screw having a flat end part engaging over the cutter to clamp it in the channel and having a curved end part engaging the exterior of the body and conforming to the exterior surface of the body to be held thereby against turning about the screw.

HARRY C. WILSON.

REFERENCES CITED

The following references are of record in the file of this patent:

UNITED STATES PATENTS

| Number | Name | Date |
|---|---|---|
| 195,100 | Dailey | Sept. 11, 1877 |
| 1,622,094 | Decker | Mar. 22, 1927 |
| 2,057,769 | Dowling et al. | Oct. 20, 1936 |